J. SCHREPLER.
MEANS FOR CONVEYING PRODUCTS, ESPECIALLY DRY FISH.
APPLICATION FILED MAR. 27, 1912.
1,076,709.   Patented Oct. 28, 1913.
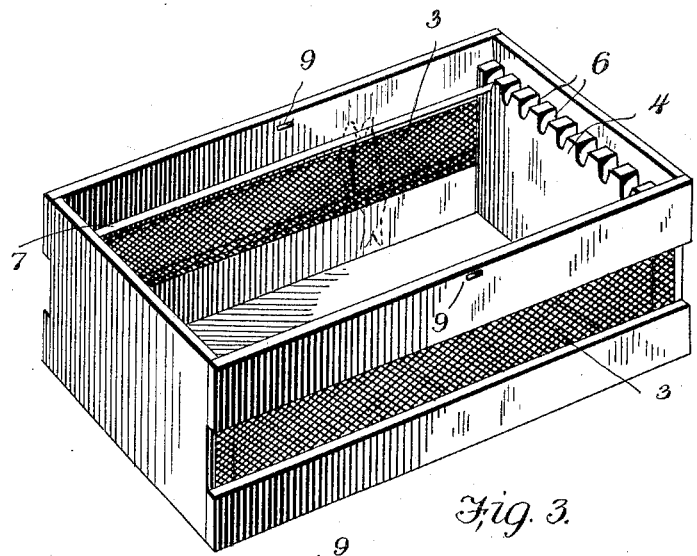
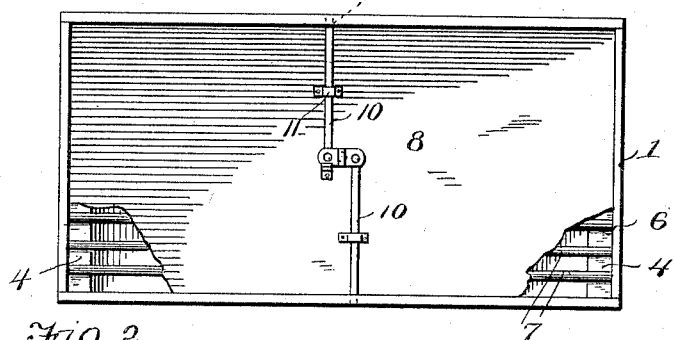
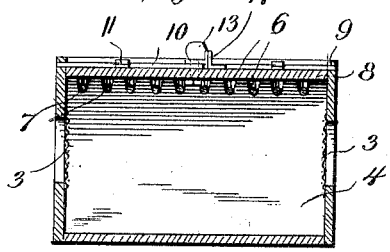
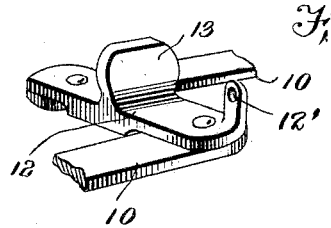
Witnesses
William Smith
Hugh Ott
Inventor
Joseph Schrepler

UNITED STATES PATENT OFFICE.

JOSEPH SCHREPLER, OF WASHINGTON, DISTRICT OF COLUMBIA.

MEANS FOR CONVEYING PRODUCTS, ESPECIALLY DRY FISH.

1,076,709.  Specification of Letters Patent.  Patented Oct. 28, 1913.

Application filed March 27, 1912. Serial No. 686,701.

*To all whom it may concern:*

Be it known that I, JOSEPH SCHREPLER, a citizen of the United States, residing in Washington, District of Columbia, have invented new and useful Improvements in Means for Conveying Products, Especially Dry Fish, of which the following is a specification.

This invention relates to means for conveying products, especially dried fish.

In carrying out my invention it is my purpose to provide means whereby fish may be suspended in a conveyer in such a manner as to prevent the bruising or mutilation of the fish by violent contact with each other.

Still a further object of the invention is the provision of means whereby fish or the like may be sustained upon suitable supports, the said supports being so arranged that the accidental removal of the same will be entirely obviated.

I also propose to provide a device of this character wherein the suspended articles will receive a free ventilation without danger of insects contacting with the same.

With the above recited objects, and others of a similar nature in view, my invention consists in the construction, combination and arrangement of parts set forth in and falling within the scope of the appended claim.

In the accompanying drawings, like characters of reference indicate like parts in all the views, and Figure 1 is a perspective view illustrating one form of my invention, the cover for the receptacle being removed. Fig. 2 is a central transverse sectional view of the same. Fig. 3 is a top plan view of the same, with parts broken away. Fig. 4 is a detail view of a lock.

As illustrated in Figs. 1, 2, 3 and 4 of the drawings, I provide a receptacle which is designated by the numeral 1. This receptacle embodies a substantially rectangular box having an open top and being provided upon its longitudinal sides with a centrally arranged opening which is closed by a reticulated member 3, the same comprising a mesh of closely woven wire which permits of the circulation of air within the said receptacle but which also prevents the entrance of insects, such as flies or the like, to the receptacle. The box 1 has its ends, or what may be termed its transverse sides reinforced through the medium of members 4, the same terminating at a suitable distance away from the top edges of the said ends. These reinforcing members 4 are notched as at 6, the said grooves being adapted to receive longitudinally extending rods 7, and these rods are adapted to be passed through the gills of a fish (illustrated in dotted lines). With this arrangement it will be noted that the rods 7 effectively support the fish and prevent the contact of the said fish one with the other, while at the same time the reticulated or screen members 3 permit of the free circulation of air to the fish. The suspended fish, however, due to the undulated path over which the receptacle 1 is adapted to travel, (it being understood that the said receptacle is adapted to be deposited within a suitable means of conveyance,) the fish will necessarily frictionally contact with each other, which will detract from the appearance of the same as well as depreciate the market value thereof. In order to sustain the firsh upon the rod 7 I have in the illustration disclosed in the said Figs. 1 to 4 provided a closure or top 8, the same being of a size sufficient to snugly close the open top of the receptacle 1 and also being adapted to compress the gills of the fish against the rods and to rest upon the members 4, and thus prevent the upward movement of the rods 7, and as a consequence, sustain the fish in proper position upon the rods. Furthermore, it is desirable to provide means for sustaining the top or closure 8 upon the receptacle, and for this reason I have provided the upper longitudinally extending members of the said receptacle with alined slots or openings 9, the same being adapted to receive the oppositely arranged bolts 10 provided upon the said top or cover 8. These bolts 10 are guided by suitable yokes 11, which are also secured upon the top, and the ends of the bolts, opposite to those which are adapted to be received within the openings 9 are pivotally connected with a cam member 12. This cam member is pivotally connected with the closure 8, and is provided with a handle 13, whereby the said closure may be moved to lock the same upon the receptacle or to permit of the removal of the same from the receptacle. The cam member 12 is further provided with an eye 12' which is adapted to register with a staple 14, also provided upon the closure and whereby a lock may be attached to secure the closure upon the receptacle, the said lock being especially desirable when the receptacle containing the fish is to be transported to a considerable distance.

From the above description, taken in connection with the accompanying drawings, the simplicity as well as the many advantages of the device will, it is thought become perceptible to those skilled in the art to which such inventions appertain without further detailed description.

Having thus described the invention what I claim is:

In a device for the purpose set forth, a receptacle having its sides centrally provided with reticulated members, reinforcing cleats at its ends, said cleats having their upper edges notched, fish suspending rods arranged within the notches of the oppositely disposed reinforcing members, a member adapted to be received within the receptacle and to engage with the reinforcing cleats thereof to retain the rods in their respective notches and to compress the portions of the fish engaged by the rods, and means for locking the said member upon the receptacle.

In testimony whereof I affix my signature in the presence of two witnesses.

JOSEPH SCHREPLER.

Witnesses:
ERNEST G. THOMPSON,
WM. J. KOERTH.

Copies of this patent may be obtained for five cents each, by addressing the "Commissioner of Patents Washington, D. C."